L. F. TATE.
LENS MOUNTING FOR EYEGLASSES.
APPLICATION FILED JAN. 9, 1915.
1,164,145.
Patented Dec. 14, 1915.
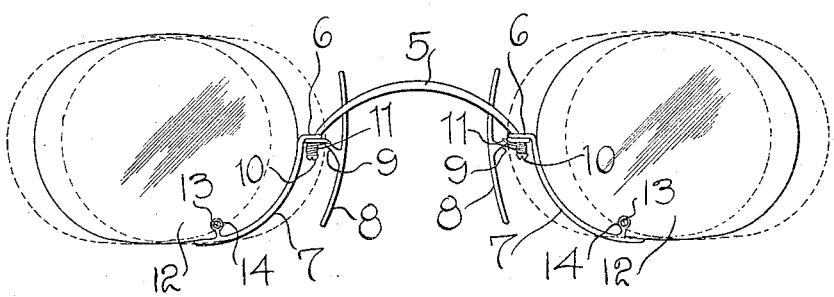
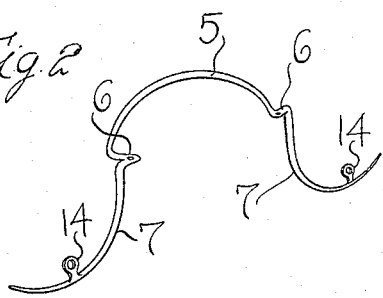
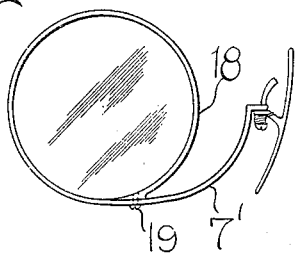
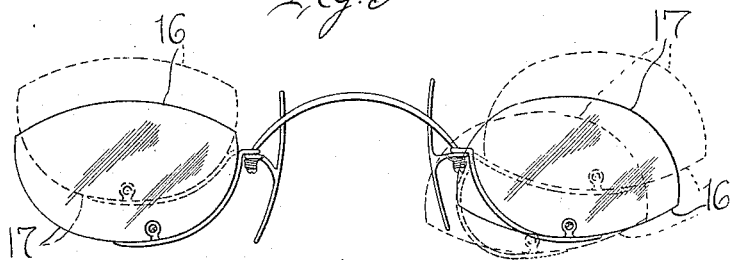
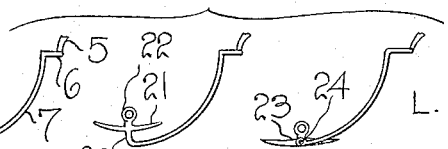
Inventor
L. F. Tate
By Watson E. Coleman
Attorney
Witnesses
Robert M. Sutphen
A. L. Hind

UNITED STATES PATENT OFFICE.

LOUIS F. TATE, OF NEWTON, ALABAMA.

LENS-MOUNTING FOR EYEGLASSES.

1,164,145. Specification of Letters Patent. Patented Dec. 14, 1915.

Application filed January 9, 1915. Serial No. 1,354.

*To all whom it may concern:*

Be it known that I, LOUIS F. TATE, a citizen of the United States, residing at Newton, in the county of Dale and State of Alabama, have invented certain new and useful Improvements in Lens-Mountings for Eyeglasses, of which the following is a specification, reference being had to the accompanying drawings.

This invention relates to an improved lens mounting for eye glasses, and has for its primary object to provide a simple, inexpensive, and durable mounting for this purpose which may be easily and quickly adjusted to dispose the lenses in proper position as may be necessitated by the requirements of the individual user.

Considered in its more specific aspect, the present invention provides a one-piece bridge and lens support, said lens support being adjustable without distorting or changing the form of the bridge whereby the position of the lenses may be varied to obtain the exact pupilary distance, or the proper distance between the two lens centers.

It is a further object of my invention to provide in a lens mounting, a bridge piece having relatively movable lens supporting arms, said arms being sufficiently long between the point of attachment of lens and the bridge to permit of all necessary adjustments of lenses to suit the individual wearer.

It is a further general object of my invention to provide an improved lens mounting of the above character with which the common form of spring held guard may be employed.

With the above and other objects in view, my invention consists in the novel features of construction, combination, and arrangement of parts to be hereinafter more fully described, claimed, and illustrated in the accompanying drawing, in which, Figure 1 is an elevation showing my improved lens mounting and illustrating the lenses in several adjusted position by means of dotted lines; Fig. 2 is a perspective view of the lens mounting, the nose guards being removed; Fig. 3 is an elevation of the mounting showing a different form of lens arranged in the mounting which is generally used for reading and near-vision: Fig. 4 is a similar view showing a modified construction of the lens mounting wherein the lenses are securely held within an annular metal rim; and Fig. 5 is a view illustrating the several different ways of mounting the lens receiving clamp upon the adjustable arm.

Referring in detail to the drawing, 5 designates the bridge piece of my improved lens mounting which is constructed of comparatively rigid, non-bendable metal, said bridge being provided at its ends with the laterally offset portions indicated at 6 substantially L-shape in form. The lens receiving arms 7 are integrally formed with these offsets and are curved outwardly and downwardly therefrom, as shown. These arms are, however, capable of being bent with respect to the offsets 6 and the bridge 5 to assume various curvatures and positions with respect to said bridge. Upon the longitudinally disposed portions of the offsets 6, the nose clamping guard members 8 are mounted, each of said guards being provided with a finger piece extension 9 which is disposed upon the under side of the offset. This extension has an opening to receive the upper end of a screw 10 which is threaded into the offset ends 6 of the bridge. Upon the shank of said screw, the spring 11 is arranged, one end of said spring being attached to the extension 9. This mounting of the nose guards is quite commonly employed in eye glass mountings, the only difference being that it is usual to arrange the pivot screws and springs above the ends of the bridge instead of below the same. As will be seen from the following description, this latter arrangement is necessary in order to permit of the proper adjustment of the lenses. It is, however, to be borne in mind that with slight necessary modifications, the present invention may also be rendered applicable to all of the several forms of guard mountings now in general use.

The lenses indicated at 12, which are of the proper size and shape, in accordance with the requirements of the individual user, are bored or provided with an opening adjacent the edge thereof to receive a fastening screw 13 which is threaded through the spaced ears 14 formed upon the extremity of the arms 7 or secured thereto. After the lenses have been secured upon the arms 7 in this manner, they may be adjusted by simply bending said arms to raise or lower the lens with respect to the bridge, or to move the lenses toward or away from each other, thus increasing or decreasing the pupilary distance, as may be necessary in fitting the glasses properly for the eyes of the particular individual so that the line of vision is directly through the center of the lenses.

As shown in Fig. 3, a reading lens 15 is secured to the adjustable arms 7, and the two edges of this type of lens describe arcs of different radii, said arcuate edges being designated by the numerals 16 and 17, respectively. The arms 7 may be properly adjusted so as to dispose the lenses below the plane of the bridge piece, when said lenses are secured upon the arms with either of their curved edges 16 or 17 engaged with said arms. The arms may also be bent or adjusted so as to position the lenses at any desired inclination with respect to the bridge piece.

Attention is now directed to Fig. 4 of the drawing, wherein I have shown a slightly modified form of the lens mounting, the extremities of the adjustable arms 7' being extended to form resilient clamping rims 18. The extreme ends of these arm extensions are slightly enlarged and provided with threaded bores to receive screws, as shown at 19, which are disposed through openings in the body portions of the lens carrying arms. In the drawing, I have shown circular lenses thus detachably mounted upon the ends of the arms 7'; but it will be understood that any of the various other forms of lenses may also be employed in connection with this type of mounting, as the extensions 18 may be readily bent to conform to the shape of the lens and properly engaged upon the edges thereof. This clamping rim for the lens is preferably of slightly channel shaped form so as to provide a groove to receive the edge of the lens and thereby overcome all liability of its displacement.

In Fig. 5, I have illustrated several ways of mounting the lens attaching or clamping devices upon the ends of the adjustable arms. The screw receiving ear 14 is formed upon the arms 7 at a slight distance from the extreme end thereof. The extremity of said arm may, however, be turned upwardly as at 20, and the same provided with the lens receiving seat 21 upon which the screw receiving ear 22 is centrally formed. Again, the lens seat member may be separately formed as at 23, and secured upon the extremity of the adjustable arm by a screw 24. Any of these several ways of mounting the lens may be employed and will be found equally satisfactory in practical use.

From the foregoing description, taken in connection with the accompanying drawing, it is believed that the construction, manner of use, and several advantages of my invention will be clearly and fully understood. The device, while of extremely simple construction, is also very serviceable and convenient in practical use and affords means for easily and quickly adjusting the lenses in proper relation to the eyes of the user without liability of bending or distorting the bridge piece from its normal condition so that the latter will, at all times, properly fit upon the nose of the wearer. It is, of course, essential that a different type of lens be employed for far-sightedness than that used when reading or otherwise employing the eyes for relatively close observations. The lenses also must be differently positioned with respect to each other and with respect to the eyes of the user, when employed for such distinctly different purposes, and further enables such adjustment to be quickly and accurately made without having to resort to the services of an optician. The device may be manufactured at but little additional expense over the ordinary type of lens mounting, and, in view of its additional advantages, such additional expense would be more than compensated for.

While I have shown and described the preferred construction of the device, it will be understood that the same is susceptible of considerable modification therein, and I, therefore, reserve the privilege of resorting to all such legitimate changes as may be fairly embodied within the spirit and scope of the invention as claimed.

Having thus fully described my invention, what I desire to claim and secure by Letters Patent is:—

A lens mounting including a bridge piece having its extremities offset forwardly to provide substantially L-shaped horizontally disposed ears, the longitudinally disposed portions of the ears terminating in lens supporting arms, in combination with nose clamps provided with ears underlying the longitudinally disposed portions of the ears of the bridge, said clamps being disposed in a direction opposite to that of the offset extremities of the bridge, and securing means extending through the ears of the nose clamps and the longitudinally disposed portions of the first mentioned ears.

In testimony whereof I hereunto affix my signature in the presence of two witnesses.

LOUIS F. TATE.

Witnesses:
J. W. BALKCOM,
M. R. SIMS.